United States Patent [19]
Shimizu et al.

[11] 4,044,984
[45] Aug. 30, 1977

[54] MOLD ASSEMBLY FOR RESIN-SEALING

[75] Inventors: Tsuyoshi Shimizu, Hinode; Katsuhiro Tabata, Kodaira, both of Japan

[73] Assignee: Hitachi, Ltd., Japan

[21] Appl. No.: 737,038

[22] Filed: Oct. 29, 1976

[30] Foreign Application Priority Data

Oct. 29, 1975  Japan .............................. 50-129206

[51] Int. Cl.² .............................................. B29C 6/00
[52] U.S. Cl. ...................................... 249/95; 249/83; 425/116; 425/127
[58] Field of Search .............. 425/112, 116, 117, 127, 425/128, 129 R; 249/83, 95

[56] References Cited

U.S. PATENT DOCUMENTS

| | | | |
|---|---|---|---|
| 2,256,769 | 9/1941 | Armine .................... | 425/116 |
| 3,250,048 | 5/1966 | Coulon ................... | 249/95 X |
| 3,368,245 | 2/1968 | Witkowski ............... | 249/83 |
| 3,463,845 | 8/1969 | DePass et al. ............ | 425/129 R X |
| 3,546,748 | 12/1970 | Gardner ................... | 425/129 R |
| 3,685,784 | 8/1972 | Spanjer ................... | 425/116 X |
| 3,753,634 | 8/1973 | Bliven et al. ............ | 425/129 R X |
| 3,971,841 | 7/1976 | Rubenstein .............. | 249/95 |

*Primary Examiner*—J. Howard Flint, Jr.
*Attorney, Agent, or Firm*—Craig & Antonelli

[57] ABSTRACT

A mold assembly for resin sealing for use in the manufacture of a semiconductor device etc., includes a pair of upper and lower molds. Elastic deformation parts adapted to be deformed in the direction of compression of the upper and lower molds with an object to-be-sealed, held therebetween, are provided on at least one of a cavity block of the upper mold and a cavity block of the lower mold. Grooves are provided in the surface of the cavity block formed with the elastic deformation parts.

10 Claims, 13 Drawing Figures

MOLD ASSEMBLY FOR RESIN-SEALING

BACKGROUND OF THE INVENTION

1. Field of the Invention

This invention relates to a mold assembly for resin sealing which is employed in the manufacture of a semiconductor device, etc.

2. Description of the Prior Art

In general, in the resin sealing process for transistors, ICs etc., resin flows out of a resin mold portion, and an abnormal protuberance (fin) is created on the surface of a lead outside the mold portion. The protuberance is an obstacle to the operation of plating, soldering, etc., of the lead, to be executed later, and is unfavorable from the viewpoint of the external appearance of a product.

A conventional mold assembly for resin sealing will be described with reference to FIG. 1, which shows an upper mold 1 and a lower mold 2. The lower mold 2 is composed of a holder 3 and cavity blocks 4. The fin referred to above develops when there exists a clearance 6 of the parting surface between the upper mold 1 or lower mold 2 and a respective lead frame 5b or 5a. That is, the fins 7a are usually formed when parts of a resin 7 injected in a space which is defined by the upper mold 1, the lower mold 2 and the two lead frames 5a and 5b percolate through the clearances 6. Such fins are formed, not only at the right and left in FIG. 1, but also in front and in the rear. In order to prevent the formation of such fins 7a, accordingly, the clearance 6 must be removed over the entire periphery of the parting surface.

As one technique for eliminating the clearance 6 and preventing the formation of the fin 7a, there has hitherto been adopted a method wherein the parting surface is endowed with a high degree of flatness by finishing it with a high degree of high precision, for example, with 5μ of flatness deviation, a method wherein the upper mold 1 and the lower mold 2 are designed so as to become high in rigidity and only slightly in deformable, or a method wherein a heat treatment for eliminating working distortion, hardening distortion, non-uniformity of the hardened structure, etc., of the material of the upper mold 1 and the lower mold 2 is accurately executed with the greatest possible care.

Even with these prior-art methods, however, the clearance appears at the parting surface between the upper mold 1 or lower mold 2 and a respective lead frame 5a or 5b as before and the development of the fin cannot be perfectly prevented where the respective parting surfaces of the cavity block 4 and the holder 3 are not flush with each other and have a step therebetween, where a plurality of cavity blocks 4 are employed and where the parting surfaces of the respective cavity blocks 4 have errors in flatness, where, when a plurality of lead frames are sealed at the same time, a difference in thickness exists between, for example, the lead frames 5a and 5b.

On the other hand, technical limitations limit the working dimensional precision of the upper mold 1 and lower mold 2, and a high cost is required to make the thicknesses of all the lead frames uniform. It has therefore been the situation that the appearance of the fin is unavoidable.

As an expedient for solving such a problem, applicants have proposed a mold assembly for resin sealing including a pair of upper and lower molds, characterized in that an elastic deformation portion adapted to be deformed along a compressive direction is provided at least either between an upper surface of a cavity block of the upper mold and an upper mold holder or between a lower surface of a cavity of the lower mold and a lower mold holder, the elastic deformation portion being deformed at the resin sealing, whereby parting surfaces of the cavity blocks and holders of said upper and lower molds and surfaces of a lead frame can be brought into close contact (Japanese Patent Application Public-Disclosure No. 11772/1975).

The proposed mold assembly for resin sealing and a method of molding with the mold assembly will now be briefly explained with reference to FIG. 2 and FIGS. 3a and 3b.

FIG. 2 is a perspective view showing a part of a cavity block 8 for use in the resin sealing mold assembly proposed, the cavity block being illustrated in the reversed state. In the figure, numeral 9 designates a projection for deformation (elastic deformation part), and a plurality of projections 9 are formed on the bottom of the cavity block 8 in a balanced arrangement of the positions thereof. The projection for deformation 9 can be elastically deformed in the vertical direction by a mold clamping pressure at the step of resin sealing. Stresses which are exerted on the deformable projections 9 at the resin sealing become repetitive stresses. The number, size, etc., of the deformable projections 9 must accordingly be selected so that the stresses may have a stress value within the compression fatigue limit of the material (for example, alloy tool steel) of the cavity block 8. Shown at 10 is a surface for preventing deformation, which is formed on the bottom of the cavity block 8 similar to the deformable projections 9 in a manner to be somewhat (indicated by $l$ in FIG. 3a) lower than the level of the surfaces of the projections 9. The surface 10 serves to limit the amount of deformation of the deformable projections 9 so as to prevent damage thereto. The parting surface of the cavity block 8 is made higher than that of the holder 3 by a value $x$ indicated in FIG. 3a beforehand in order that clearances caused by errors in flatness of the parting surface, etc., may be absorbed by the deformable projections 9 at the mold clamping. The value $l$ is made greater than the value $x$.

FIGS. 3a and 3b illustrate a method in which lead frames are resin-sealed by the use of the resin sealing mold assembly having such cavity blocks 8. FIG. 3a shows a sectional structure of the state in which the lead frames 5a and 5b are placed on the lower mold 2 with the cavity blocks 8 integrally assembled in the holder 3 of the lower mold 2, the lead frames being subsequently subjected to the mold clamping by the upper mold and the lower mold. As is shown in FIG. 3b, the lead frames 5a and 5b are held between the upper mold 1 and the lower mold 2, and the load of a mold clamping pressure P is exerted on the upper mold 1 and the lower mold 2. Before exerting the load of the mold clamping pressure P (in the state of FIG. 3a), the parting surfaces of the cavity blocks 8 lie at a level higher by the value $x$ than the parting surface of the holder 3, and hence, the mold clamping pressure P is applied to the parting surfaces of the cavity blocks 8. Thus, the deformable projections 9 provided on the bottoms of the cavity blocks 8 are elastically compressed and deformed by the clearance $x$, and the respective parting surfaces of the cavity blocks 8 and the holder 3 come into agreement. Accordingly, when the resin 7 is injected under this state, the fins of the resin as in the prior art are not formed. Even when the lead frames 5a and 5b have a difference in thickness, the deformable projections 9 undergo elastic deformation so as to eliminate the clearances between the lead frames 5a, 5b and the parting surfaces of the cavity blocks 8, and hence, the generation of the fins can be prevented similarly to the above.

However, this technique is not problem-free. Even with such a resin sealing mold assembly, where the lead frame is locally thick or thin in a range of several μm — several tens of μm within the single lead frame, especially where the surface of the lead frame swells, it is extremely difficult to bring the parting surfaces of all the cavity blocks and the holders of the upper and lower molds and the surfaces of the lead frames into close contact according to the swell, with the result that thin resin fins develop.

Further, as shown in FIG. 4a, the prior-art mold assembly for resin sealing has a step indicated at A between that parting surface 11 of the holder 3 for receiving the cavity block 8 which comes into contact with the upper mold 1 and the surface 12 with which the lead frame is to be closely contacted when the deformable projections 9 of the cavity block are compressed by $x$ by the mold clamping. Accordingly, where the lead frame 5c, whose thickness $t$ is smaller than the value of the step A, is sealed by such a mold assembly, the cavity block 8 is deformed only by the value of the height $t_1$ by which the lead frame projects beyond the parting surface 11. As is shown in FIG. 4b, therefore, even when the upper mold and the lower mold are clamped by the mold clamping pressure P, a clearance B, having a valve of $(A - t)$, arises between the lead frame and the surface 12, and the resin fin develops at the clearance part.

SUMMARY OF THE INVENTION

It is accordingly an object of this invention to provide a mold assembly for resin sealing with which, even when the thick part and thin part exist within the single lead frame as stated above, resin sealing can be conducted without causing percolation of the resin molding.

It is, accordingly, another object of the invention to provide a mold assembly for resin sealing with which no resin fin develops in the case of any lead frame irrespective of the above step A and the thickness of the lead frame.

In order to accomplish such objects, the invention consists in a mold assembly for resin sealing which includes a pair of upper and lower molds and in which an elastic deformation portion extending along a compressive direction is provided at least either in an upper mold cavity block or in a lower mold cavity block, characterized in that grooves are provided longitudinally and transversely at least on the side of the cavity block on which the elastic deformation portion is provided.

Another characterizing feature of the invention is that the width of the cavity block is made substantially equal to the width of a lead frame, whereby the lead frame can ascent and descend within the holder together with the cavity block.

DETAILED DESCRIPTION OF PREFERRED EMBODIMENTS OF THE INVENTION

Figure 1:
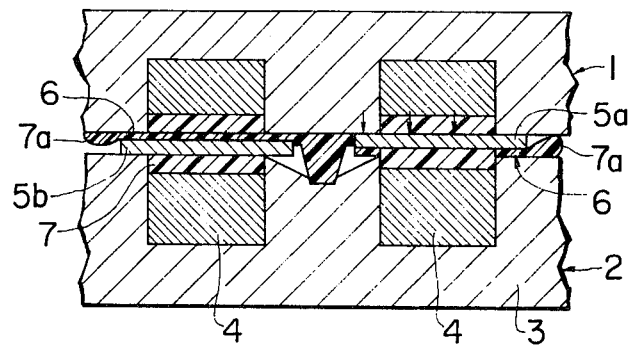
FIG. 1 is a partial sectional view of a conventional mold assembly for resin sealing.
Figure 3A:
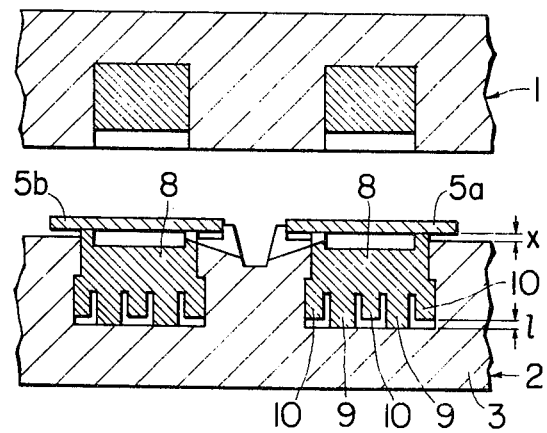
FIGS. 3a and 3b are partial sectional views of the resin sealing mold assembly proposed, the formed of which illustrates the state before sealing and the latter the state at the sealing.
Figure 3B:
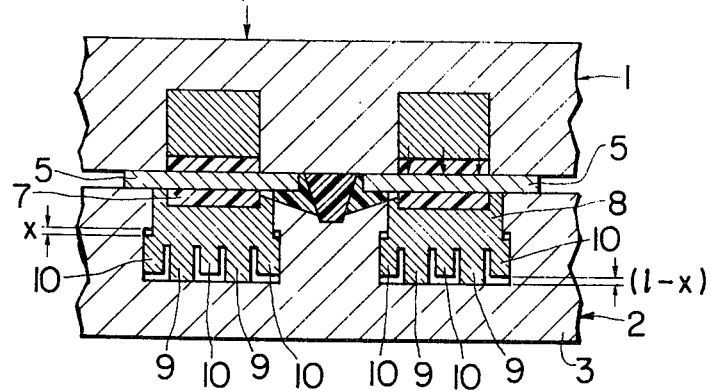
Figure 2:
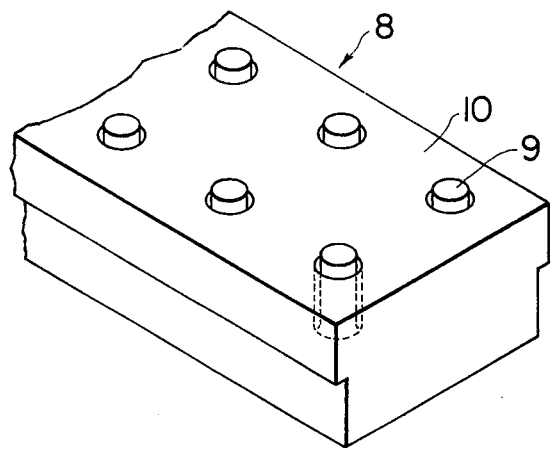
FIG. 2 is a partial perspective view of a cavity block for use in a resin sealing mold assembly which has been already proposed by the inventors of this application.
Figure 5:
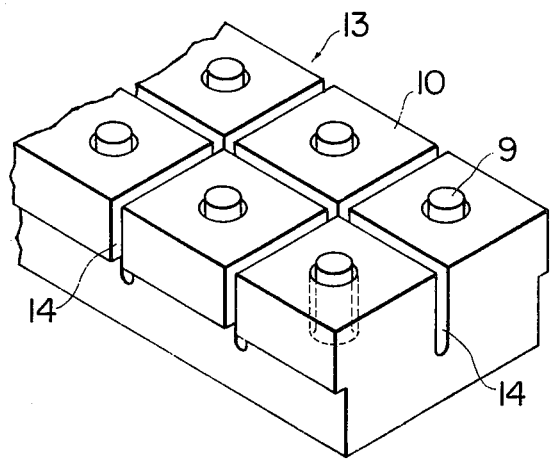
FIG. 5 is a partial perspective view showing the reversed state of a lower mold cavity block of a resin sealing mold assembly embodying this invention.

FIG. 5 shows a part of a lower mold cavity block embodying the invention. In the illustration, the lower mold cavity block 13 is turned upside down. Unlike the structure of the lower mold cavity block 4 in FIG. 2, as previously proposed by the inventors, grooves 14 are provided longitudinally and transversely so that the elastic deformation portion 9 may lie substantially at the center of each section defined by the grooves. The grooves 14 are formed in the deformation preventing surface 10.

Figure 6A:
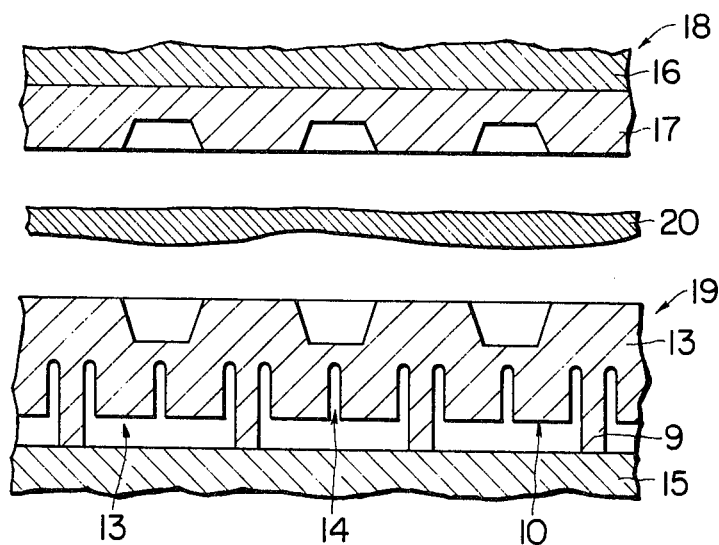
FIGS. 6a and 6b are partial sectional views showing the states of the mold assembly of the embodiment before and after sealing, respectively.
Figure 6B:
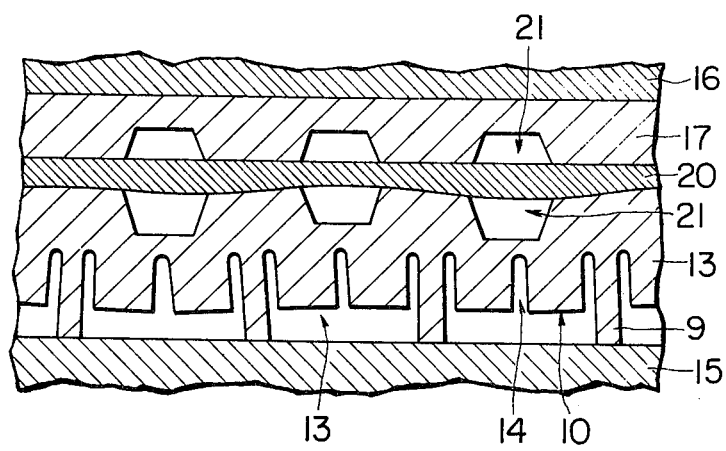

The state in which the resin sealing is carried out with such lower mold cavity block 13 is illustrated in FIGS. 6a and 6b. As shown in FIG. 6a, the cavity block 13 is assembled on a lower mold holder 15, and an upper mold cavity block 17 is assembled on an upper mold holder 16. A lead drame 20 to be resin-sealed is placed between an upper mold 18 and a lower mold 19 which have thus been put into the integral forms, respectively.

Subsequently, the upper mold 18 is caused to descend, to define mold spaces (cavities) 21 as shown in FIG. 6b. The resin is injected into the mold spaces (cavities) 21 so as to execute the sealing. In this case, the lead frame 20 can be locally thick or thin or have a large swelling on the surface as illustrated in the figure. The lower mold cavity block 13 is provided with the grooves 14 longitudinally and transversely so that, under a great load, it may be easily deformed in correspondence with the load. Consequently, when the surface of the lead frame 20 swells greatly, as described above, the respective cavity blocks 13 are deformed so as to extend along the swell. With such a resin sealing mold assembly, accordingly, the parting surfaces of all the cavity blocks of the upper mold and the lower mold are reliably held in close contact with the surfaces of the lead frame, so that the fins, due to the percolation of the resin, as in the prior art, do not appear.

Figure 7:
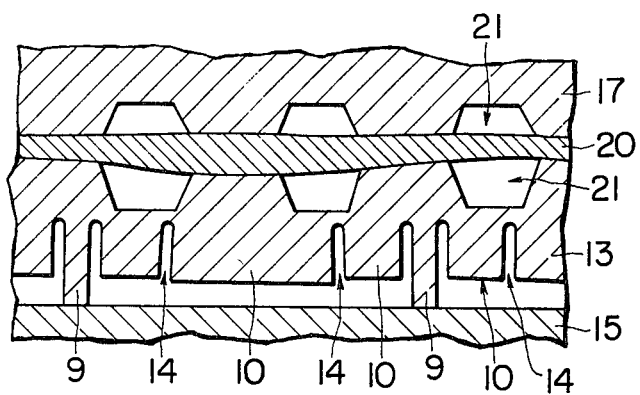
FIGS. 7 and 8 are partial sectional views each showing another embodiment of this invention.

The invention is not restricted to the above embodiment. For example, it is not always necessary to provide one elastic deformation portion 9 in correspondence with one cavity block 13, but it is permissible to provide one elastic deformation portion for every second cavity block, as shown in FIG. 7. Thus, the effect can be enhanced also for the spread swelling of the object to-be-sealed such as the lead frame.

Figure 8:
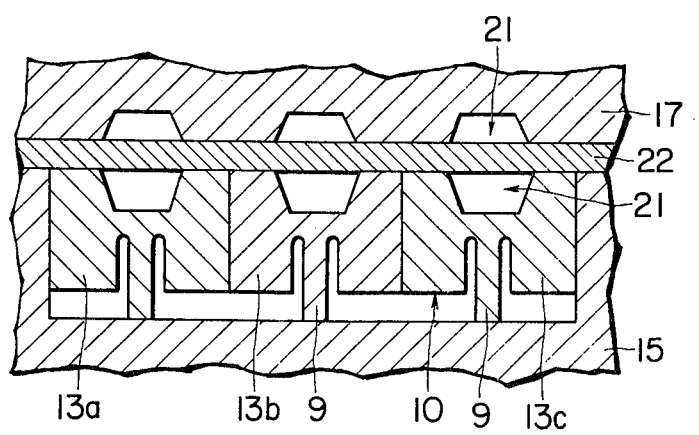

As is shown in FIG. 8, the cavity block 13 may be split into unit cavity blocks 13a, 13b, 13c . . . without providing the grooves in the lower mold cavity block, so as to hold the upper surfaces of the respective unit cavity blocks 13a, 13b, 13c . . . in close contact with a lead frame 22.

The elastic deformation parts and the grooves may well be provided in the upper mold. The elastic deformation part may be provided between the upper mold cavity block (lower mold cavity block) and the upper mold holder (lower mold holder). By way of example, a protrusion as the elastic deformation part may be provided on the surface of the upper mold holder (lower mold holder), or a columnar member as the elastic deformation part may be inserted between the upper mold (lower mold) and the upper mold holder (lower mold holder).

Further, the invention can, of course, be applied to any field other than the manufacture of semiconductor devices.

Figure 4A:
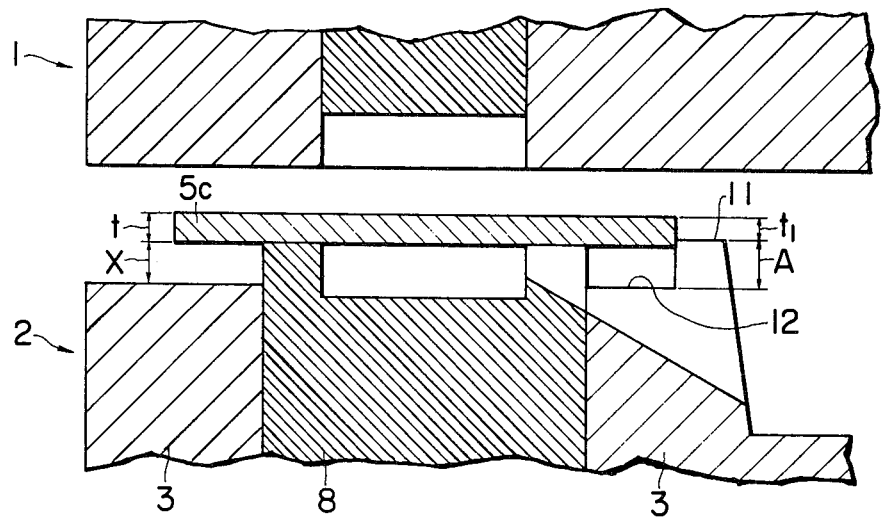
FIGS. 4a and 4b are partial sectional views in the case of performing the sealing by the use of the prior-art mold assembly, respectively.
Figure 4B:
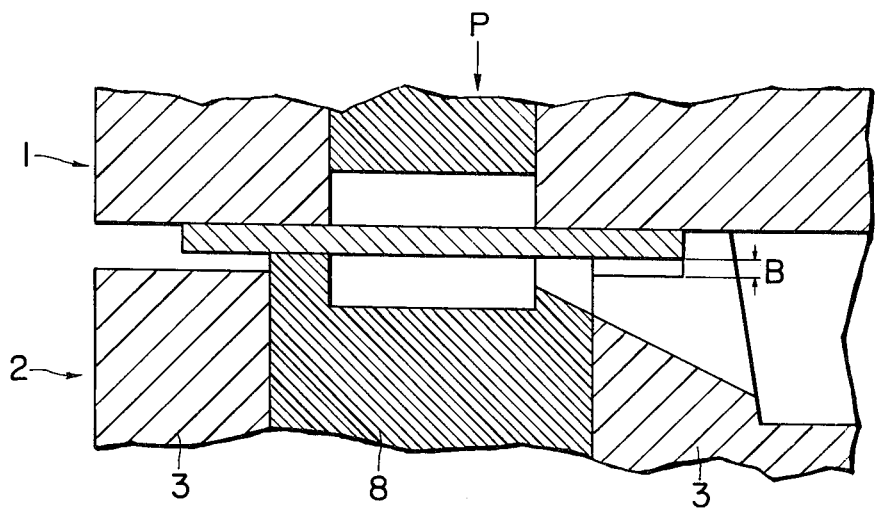
Figure 9A:
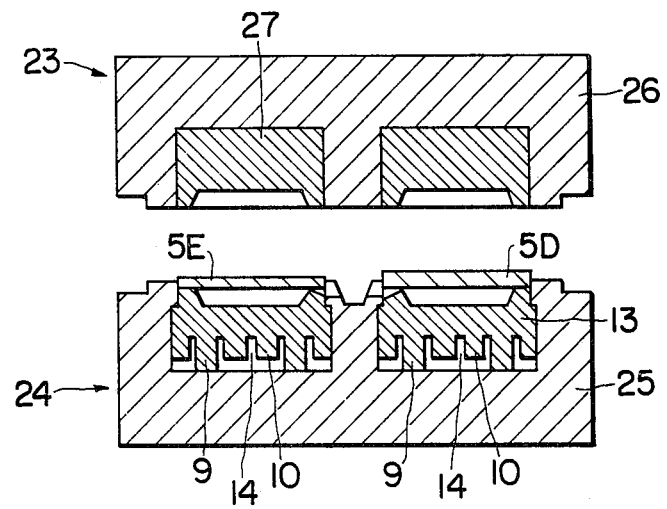
FIGS. 9a and 9b are partial sectional views of a sealing mold assembly showing still another embodiment of this invention.
Figure 9B:
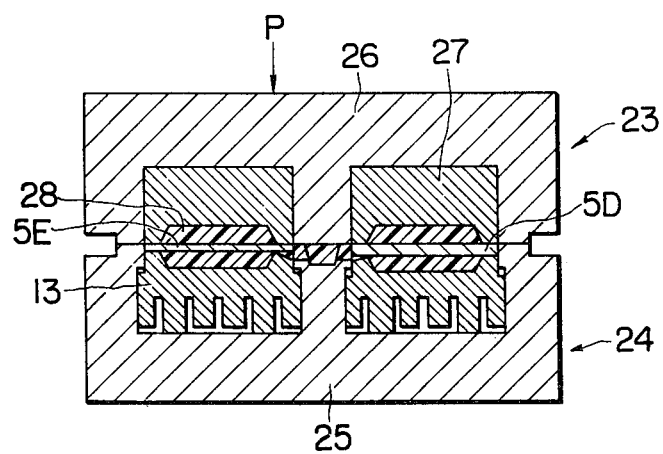

FIGS. 9a and 9b show still another embodiment of the invention. In this embodiment, the cavity block 13 is formed to be equal to or somewhat larger than a lead frame. Thus, when the lead frames are clamped by an upper mold 23 and a lower mold 24, they are vertically moved in a lower mold holder 25 together with the cavity blocks. A method in which lead frames 5D and 5E of different thicknesses are resin-sealed by the use of such mold assembly will be explained with reference to FIGS. 9a and 9b. As is shown in FIG. 9a, the lead frames 5D and 5E of different thicknesses are placed on the cavity blocks 13 of the lower mold 24. Numeral 26 designates an upper mold holder, and numeral 27 and upper mold cavity block. Subsequently, as is shown in FIG. 9b, the upper mold 23 is lowered, a pressure P is exerted on the upper and lower molds so as to clamp the mold assembly, and resin is injected into mold portions 28 so as to seal the lead frames. As is apparent from the figures, even where the lead frames 5D and 5E of different thicknesses are resin-sealed at the same time, the respective lead frames 5D and 5E descend into the holder, together with the corresponding cavity blocks 13, when subjected to the mold clamping, and the lead frames are perfectly enclosed in the upper and lower molds. According to the present embodiment, the clearance B, as explained with reference to FIG. 4b, does not appear, with the result that the development of the resin fin can be perfectly prevented.

As described above, in accordance with the resin sealing mold assembly of the invention, the parting surfaces of the upper and lower molds come into close contact with the surfaces of the object to-be-sealed (object to-be-molded), so that percolation of the resin or the like for the sealing, as in the prior art, does not occur. Accordingly, an object to-be-sealed (object to-be-molded) of excellent external appearance can be obtained.

While we have shown and described several embodiments in accordance with the present invention, it is understood that the same is not limited thereto, but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In a mold assembly including a pair of upper and lower molds, said upper and lower molds having parting surfaces and clamping an object to-be-sealed between said parting surfaces so as to effect resin sealing of said object,
  the improvement wherein each of said upper and lower molds comprises a cavity block and a holder formed with a concave portion for receiving said cavity block therein, said cavity block of at least one of said upper and lower molds being formed with
  a concave portion so as to define a mold space on the side on which it comes into contact with said object to-be-sealed,
  protrusions for deformation projecting beyond a surface of said cavity block on a side on which it comes into contact with a bottom surface of said concave portion of said holders, and
  grooves of a desired depth in said surface of said cavity block among said protrusions for deformation.

2. The improved mold assembly for resin sealing according to claim 1, wherein said cavity block is formed to be substantially equal in size to said object to-be-sealed, so that when clamped by said upper and lower molds, said object to-be-sealed is vertically moved in said holder together with said cavity block.

3. The improved mold assembly for resin sealing according to claim 1, wherein said cavity block is formed so that its parting surface may project beyond the parting surface of said holder by a prescribed value $x$ when it is received in said concave portion of said holder, and wherein said protrusions for deformation are constructed so that they may project beyond the cavity block surface formed with said protrusions for deformation by a predetermined value.

4. The improved mold assembly for resin sealing according to claim 3, wherein said predetermined value is greater than said value $x$.

5. In a mold assembly for resin-sealing an object to be sealed and having a pair of molds having parting surfaces between which an object to be resin-sealed is clamped,
  the improvement wherein each of said molds comprises a cavity block and a cavity block holder formed with a concave portion for receiving said cavity block therein, the cavity block of one of said molds including
  a first surface facing the cavity block of the other mold of said pair,
  a second surface facing the cavity block holder of said mold,
  a cavity extending from said first surface to a prescribed depth into the cavity block,
  at least one protrusion extending from the cavity block to a distance beyond said second surface and in contact with the cavity block holder of said one mold, and
  a plurality of grooves extending from said second surface to a predetermined depth into the cavity block so as to segment the second surface of the cavity block.

6. The improved mold assembly according to claim 5, wherein each of said protrusion has a base portion disposed at the bottom of one of said grooves.

7. The improved mold assembly according to claim 5, wherein a plurality of grooves are disposed between each pair of protrusions.

8. The improved mold assembly according to claim 7, wherein each of said protrusion has a base portion disposed at the bottom of one of said grooves.

9. The improved mold assembly according to claim 5, wherein a cavity block is comprised of a plurality of elemental cavity block units each having a cavity, a groove, and a protrusion which extends from the bottom of the protrusion to contact the block holder.

10. The improved mold assembly according to claim 9, wherein the bottom of the groove from which a respective protrusion extends is aligned with the bottom of the cavity of the cavity block unit.

* * * * *